United States Patent [19]

Nakajima et al.

[11] Patent Number: 5,017,444
[45] Date of Patent: May 21, 1991

[54] LITHIUM CELL

[75] Inventors: Tsuyoshi Nakajima, Nishisakaidani; Rachid Yazami, Higashi, both of Japan

[73] Assignee: Mitsubishi Kasei Corporation, Tokyo, Japan

[21] Appl. No.: 575,564

[22] Filed: Aug. 31, 1990

[51] Int. Cl.⁵ ............................................. H01M 4/58
[52] U.S. Cl. .................................... 429/218; 429/192; 429/194
[58] Field of Search ............... 429/218, 209, 192, 194; 252/182.1; 423/448, 447.1

[56] References Cited

U.S. PATENT DOCUMENTS

| | | | |
|---|---|---|---|
| 3,956,194 | 5/1976 | Armand | 429/218 X |
| 4,686,161 | 8/1987 | Shia et al. | 429/194 X |
| 4,737,423 | 4/1988 | Tung | 429/194 |
| 4,792,504 | 12/1988 | Schwab et al. | 429/192 |
| 4,863,818 | 9/1989 | Yoshimoto et al. | 429/218 |

Primary Examiner—Anthony Skapars
Attorney, Agent, or Firm—Oblon, Spivak, McClelland, Maier & Neustadt

[57] ABSTRACT

A lithium cell comprising a negative pole made of lithium and a positive pole made of a vanadium fluoride-graphite intercalation compound of the formula $C_xVF_6$ wherein x is from 8.0 to 80.

9 Claims, 2 Drawing Sheets

LITHIUM CELL

BACKGROUND OF THE INVENTION

1. Field of the Invention

The present invention relates to a lithium cell.

2. Discussion of Background

With rapid progress of electronic technology in recent years, trend for small sizes and light weights of electronic appliances is remarkable, and expectation for cells as their power sources is likewise high. Namely, there is substantial expectation for cells provided with excellent storage stability as well as high energy density with small sizes and light weights.

As the most prospective cell system to satisfy such expectation, a research has been active for developing lithium cells wherein lithium is used as the negative pole.

For such lithium cells, a search for a material for the positive pole is an important objective. Among them, a lithium cell using as the positive pole fluorinated graphite which is a fluorine-carbon intercalation compound, has excellent properties satisfying the initial objective and has already been commercially developed.

However, an active research is being made to develop a lithium cell having a higher energy density, better discharge properties and storage stability, as the next objective.

SUMMARY OF THE INVENTION

The present inventors have synthesized various graphite intercalation compounds and have studied their applicability as the positive pole for a lithium cell. As a result, the present invention has been accomplished.

Thus, the present invention provides a lithium cell comprising a negative pole made of lithium and a positive pole made of a vanadium fluoride-graphite intercalation compound of the formula $C_xVF_6$ wherein x is from 8.0 to 80.

DETAILED DESCRIPTION OF THE PREFERRED EMBODIMENTS

Figure 1:
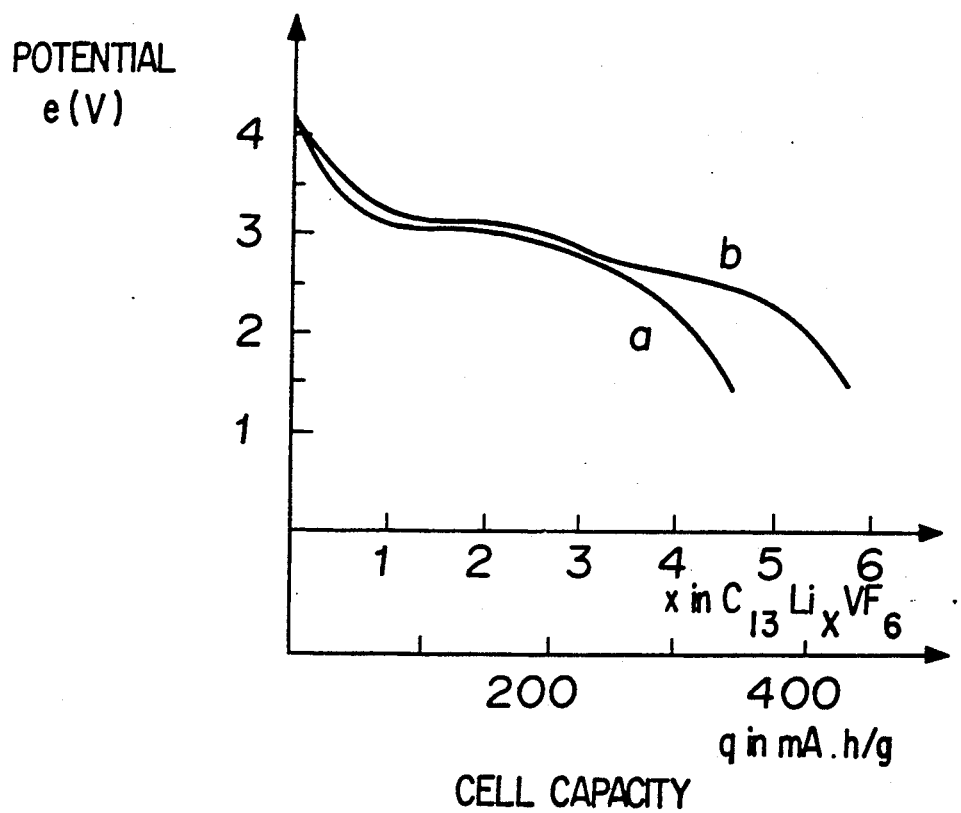
FIG. 1 shows the discharge characteristics under constant current density of a lithium cell of the present invention.

Now, the present invention will be described in detail with reference to the preferred embodiments.

In the present invention, the lithium cell comprises a negative pole to discharge electrons when connected to an external load, a positive pole to receive electrons, an ion conductive electrolyte solution or solid electrolyte, and a separator to prevent electronic short circuiting between the positive pole and the negative pole when liquid electrolyte is used.

In the cell according to the present invention, a vanadium fluoride-graphite intercalation compound of the formula $C_xVF_6$ (x=8.0-80) is employed as the positive pole. Such vanadium fluoride-graphite intercalation compound is obtained by reacting vanadium pentafluoride ($VF_5$) to a carbon material. The carbon material is not particularly limited and may optionally be selected from e.g. natural graphite, petroleum coke, pitch coke, petroleum coke or pitch coke graphitized by heat treatment, pyrolytic graphite and carbon fiber. Vanadium pentafluoride can be obtained by fluorinating metallic vanadium powder with fluorine gas. The fluorinated product can be employed by itself for the reaction. For example, natural graphite and metallic vanadium powder are placed in separate nickel boats, which are then placed in a reaction tube. Then, the temperature is raised to the reaction temperature (180–240° C.) under vacuuming, and fluorine gas is then introduced under a pressure of from 0.1 to 1 atm, and then the system is maintained under a predetermined pressure. In a case where the reaction temperature is set at a level of from 140 to 160° C., vanadium is first fluorinated at 200° C. for a few hours, and then the temperature is lowered to the reaction temperature.

The composition of the vanadium fluoride-graphite intercalation compound obtained in such a manner is represented by $C_xVF_6$ wherein x is from 8.0 to 80, preferably from 8.0 to 20.

The graphite intercalation compound of the present invention may be of stage 1 type in which vanadium fluoride is intercalated between carbon every layers, of stage 2 type in which vanadium fluoride is intercalated between carbon layers at every second carbon layer, or of any higher stage type. The stage type may optionally be selected depending upon the purpose of whether the cell is intended for a high potential and high discharge properties or for a large capacity. The intercalation compounds of different stages may be used in combination.

Further, other fluorinated graphite such as $(CF)_n$ or $(C_2F)_n$, manganese dioxide, or the like may be combined for use. When the vanadium fluoride-graphite intercalation compound is used as the positive pole, it has high conductivity like a metal as is different from insulating fluorinated graphite, and no conductive material or current collector is required.

On the other hand, as the negative pole, lithium is employed. This lithium may be simple substance of lithium or a lithium alloy.

Now, as the electrolyte solution, an organic electrolyte solution having a solute such as an alkali metal salt to provide ionic conductivity dissolved in a non-aqueous organic solvent, is used to avoid the reaction of lithium as the negative pole with water. As the organic solvent, an aprotic solvent not reactive with lithium is employed. To attain the operability within a wide temperature range and to provide high ionic conductivity, it is preferred to use, for example, propylene carbonate, butyrolactone, dimethoxyethane and tetrahydrofuran alone or in combination as a mixture.

As the solute to be dissolved in such an organic solvent, lithium perchloric acid ($LiClO_4$) or lithium borofluoride ($LiBF_4$) is preferred from the viewpoint of the solubility. Instead of such an electrolytic solution, a solid electrolyte such as polyethylene oxide may be used.

As the separator, a porous material is preferred to minimize the internal resistance of the cell. An organic solvent-resistant material such as a glass filter or a nonwoven fabric of e.g. polypropylene, may be employed.

The above described negative pole, positive pole, electrolyte solution and separator, are usually packed in a cell case made of e.g. stainless steel or nickel-plated stainless steel.

The cell structure may be a spiral structure wherein strip-shaped positive and negative poles are spirally wound with a separator interposed therebetween. Otherwise, a method may be employed wherein a pellet-shaped positive pole and a disk-shaped negative pole are inserted with a separator interposed therebetween in a button-shaped casing.

The cell according to the present invention may be used not only as a primary cell but also as a secondary cell capable of being charged and discharged. Also in this case, the cell structure may be the same as described above, but as the electrolyte, various lithium salts may be used in addition to lithium perchloric acid (LiClO$_4$) and lithium borofluoride (LiBF$_4$).

Now, the present invention will be described in further detail with reference to an Example. However, it should be understood that the present invention is by no means restricted to such a specific Example.

EXAMPLE 1

A button-shaped lithium cell was constructed using lithium metal (lithium foil, 16 $\phi$mm$\times$0.3 mm) as the negative pole, C$_x$VF$_6$ (x : 13, powder material was pelletized, 16 $\phi$mm$\times$0.5 mm) as the positive pole, 0.01 ml of a 1M LiClO$_4$ propylene carbonate solution as the electrolyte solution and a polypropylene separator. The positive pole discharge characteristics of the cell are shown in FIG. 1 (a=100 l$\mu$A, b=10 $\mu$A).

As shown in FIG. 1, the potential is high (3.02 V at i=10 $\mu$A, and 2.96 V at i=100 $\mu$A). Even if the current value is increased ten times, the potential does not substantially change, and the decrease of the capacity is also small.

From five to six Li$^+$ are coordinated to six F of VF$_6^-$, and substantially all fluorine will be utilized for the cell chemical reaction.

Figure 2:
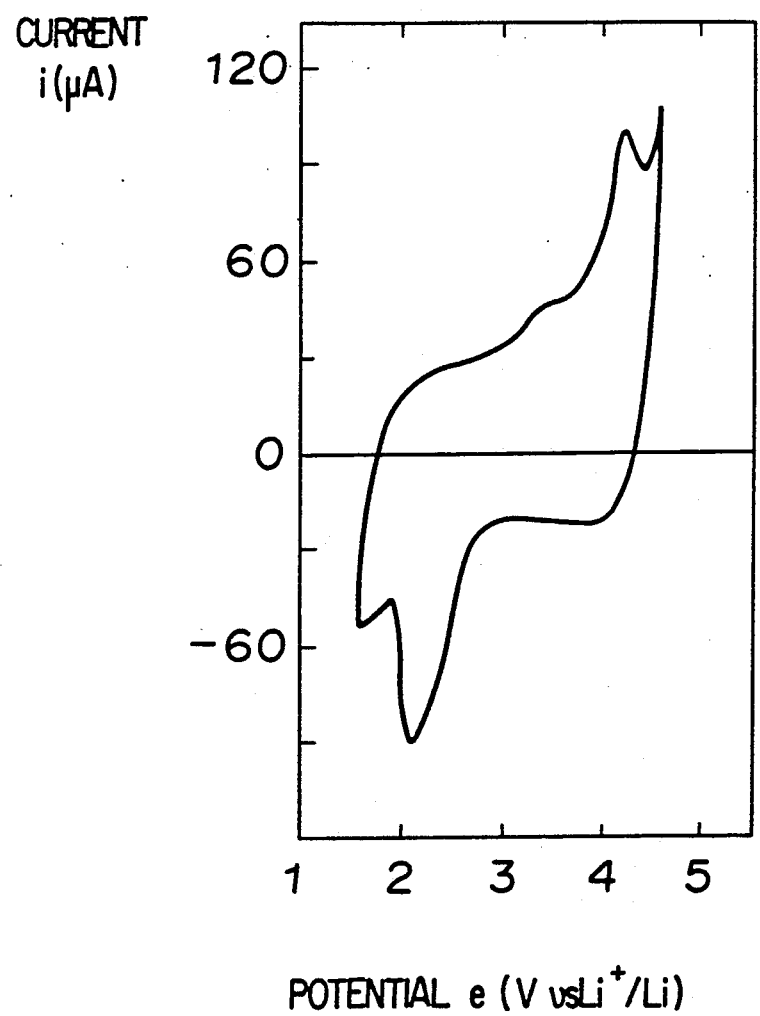
FIG. 2 shows the charge-discharge characteristics of the same lithium cell.

FIG. 2 shows the charge-discharge characteristics (scanning speed: 1 mV/min).

This indicates that the association and dissociation of Li$^+$ to and from C$_x$VF$_6$ take place reversibly.

Further, Table 1 shows a comparison in the performance with two types of lithium cells which have been practically employed.

Namely, the lithium cell of the present invention (Example 1) has a high discharge potential. The capacity and the energy density are higher than those of the Li/MnO$_2$ cell, but lower than those of the Li/(CF)$_n$. Thus, it has properties intermediate between the two lithium cells.

TABLE 1

Comparison in performance between the Li/C$_x$VF$_6$ cell and conventional lithium cells

| Type of lithium cell | Voltage (V) Initial voltage | Voltage (V) Operation voltage | Capacity (mAh/g) | Energy density (wh/kg) | Charge and discharge properties |
|---|---|---|---|---|---|
| Li/MnO$_2$ | 3 | 2.8 | 310 | 870 | Nil |
| Li/(CF)$_x$ | 3.3 | 2.3 | 800 | 1840 | Nil |
| Li/VF$_6$-GIC | 4.02 | 3.0 | 430 | 1200 | Yes |

The lithium cell of the present invention shows a high potential, and the overvoltage does not substantially increase when the current value is increased. It not only has excellent discharge characteristics but is both chargeable and dischargeable. It is stable and easy to handle, and it is excellent in the storage stability.

What is claimed is:

1. A lithium cell comprising a negative pole made of lithium and a positive pole made of a vanadium fluoride-graphite intercalculation compound of the formula C$_x$VF$_6$ wherein x is from 8.0 to 80.

2. The lithium cell according to claim 1, wherein x is from 8.0 to 20.

3. The lithium cell according to claim 1, wherein the intercalculation compound is obtained by reacting vanadium pentafluoride to a carbon material.

4. The lithium cell according to claim 3, wherein the carbon material is natural graphite, petroleum coke, pitch coke, petroleum coke or pitch coke graphitized by heat treatment, pyrolytic graphite, or carbon fiber.

5. The lithium cell according to claim 1, wherein the negative pole is made of simple substance of lithium or a lithium alloy.

6. A lithium cell comprising a negative pole, a positive pole, an electrolyte and a separator to prevent electronic short circuiting between the positive pole and the negative pole, wherein the negative pole is made essentially of lithium or a lithium alloy, and the positive pole is made essentially of a vanadium fluoride-graphite intercalation compound of the formula C$_x$VF$_6$ wherein x is from 8.0 to 80.

7. The lithium cell according to claim 6, wherein the electrolyte is an organic electrolyte having an alkali metal salt as a solute dissolved in an organic solvent.

8. The lithium cell according to claim 6, wherein the electrolyte is a solid electrolyte of polyethylene oxide.

9. The lithium cell according to claim 6, wherein the separator is a porous material.

* * * * *

UNITED STATES PATENT AND TRADEMARK OFFICE
CERTIFICATE OF CORRECTION

PATENT NO. : 5,017,444
DATED : May 21, 1991
INVENTOR(S) : Tsuyoshi Nakajima et al It is certified that error appears in the above-identified patent and that said Letters Patent is hereby corrected as shown below:

On the title page, please insert the following:

--[30] Foreign Application Priority Data
August 31, 1989 [JP] Japan ................. 61-225267--.

Signed and Sealed this

Fifth Day of January, 1993

*Attest:*

DOUGLAS B. COMER

*Attesting Officer*  *Acting Commissioner of Patents and Trademarks*